United States Patent
Deng et al.

(10) Patent No.: US 11,017,580 B2
(45) Date of Patent: May 25, 2021

(54) FACE IMAGE PROCESSING BASED ON KEY POINT DETECTION

(71) Applicant: BEIJING MICROLIVE VISION TECHNOLOGY CO., LTD, Beijing (CN)

(72) Inventors: Han Deng, Beijing (CN); Jinfeng Lai, Beijing (CN); Zhichao Liu, Beijing (CN)

(73) Assignee: BEIJING MICROLIVE VISION TECHNOLOGY CO., LTD, Beijing (CN)

( * ) Notice: Subject to any disclaimer, the term of this patent is extended or adjusted under 35 U.S.C. 154(b) by 0 days.

(21) Appl. No.: 16/980,323

(22) PCT Filed: Jan. 25, 2019

(86) PCT No.: PCT/CN2019/073074
§ 371 (c)(1),
(2) Date: Sep. 11, 2020

(87) PCT Pub. No.: WO2020/001013
PCT Pub. Date: Jan. 2, 2020

(65) Prior Publication Data
US 2021/0074054 A1    Mar. 11, 2021

(30) Foreign Application Priority Data
Jun. 28, 2018    (CN) .......................... 201810687841.2

(51) Int. Cl.
*G09G 5/00*    (2006.01)
*G06T 15/04*    (2011.01)
(Continued)

(52) U.S. Cl.
CPC ............ *G06T 15/04* (2013.01); *G06K 9/0061* (2013.01); *G06K 9/00228* (2013.01); *G06T 3/4007* (2013.01); *G06T 17/20* (2013.01)

(58) Field of Classification Search
CPC ....... G06T 2207/30201; G06T 2210/44; G06T 11/203; G06T 17/00; G06T 19/20;
(Continued)

(56) References Cited

U.S. PATENT DOCUMENTS

| 6,879,324 B1 | 4/2005 | Hoppe |
| 7,742,623 B1 | 6/2010 | Moon et al. |

(Continued)

FOREIGN PATENT DOCUMENTS

| CN | 101814192 A | 8/2010 |
| CN | 103824269 A | 5/2014 |

(Continued)

OTHER PUBLICATIONS

International Patent Application No. PCT/CN2019/073074; Int'l Search Report; dated Apr. 30, 2019; 2 pages.

*Primary Examiner* — Weiming He
(74) *Attorney, Agent, or Firm* — BakerHostetler

(57) ABSTRACT

There are provided an image processing method, an image processing device, a hardware device for image processing, a computer readable storage medium, and an image processing terminal. The image processing method includes: recognizing eye key points on a face image; performing interpolation to obtain auxiliary key points, where the auxiliary key points and the eye key points form a first triangulation mesh at a predetermined eye position on the face image; and transforming, based on the first triangulation mesh, an eye makeup effect image to the predetermined eye position.

19 Claims, 4 Drawing Sheets

(51) Int. Cl.
*G06K 9/00* (2006.01)
*G06T 3/40* (2006.01)
*G06T 17/20* (2006.01)

(58) Field of Classification Search
CPC ............. H04N 5/23219; H04N 19/587; G06K 9/00268; G06K 9/00281; G06K 9/00906; G06K 9/00201; G06K 9/00208; G06K 9/627

See application file for complete search history.

(56) References Cited

U.S. PATENT DOCUMENTS

2014/0219526 A1* 8/2014 Linguraru .......... G06K 9/00302
382/128
2017/0243054 A1* 8/2017 Lee .................... G06K 9/00281

FOREIGN PATENT DOCUMENTS

| CN | 107330868 A | 11/2017 |
|----|-------------|---------|
| CN | 107341777 A | 11/2017 |
| CN | 107680033 A | 2/2018  |
| CN | 107818543 A | 3/2018  |
| CN | 107977934 A | 5/2018  |
| CN | 109063560 A | 12/2018 |

\* cited by examiner

FACE IMAGE PROCESSING BASED ON KEY POINT DETECTION

CROSS REFERENCE TO RELATED APPLICATION

The present application is the national phase application of PCT International Patent Application No. PCT/CN2019/073074, filed on Jan. 25, 2019 which claims priority to Chinese Patent Application No. 201810687841.2, titled "IMAGE PROCESSING METHOD AND DEVICE, COMPUTER READABLE STORAGE MEDIUM AND IMAGE PROCESSING TERMINAL", filed on Jun. 28, 2018 with the Chinese Patent Office, all of which are incorporated herein by reference in their entireties.

FIELD

The present disclosure relates to the technical field of images, and in particular to an image processing method, an image processing device, a computer readable storage medium, and an image processing terminal.

BACKGROUND

In recent years, people have paid more and more attention to the beauty and ugliness of appearance, and the plastic surgery technology has developed rapidly. However, there is a great risk in face cosmetic surgery, because the doctors do not know what the result of the cosmetic surgery is. The above problem can be solved by virtually performing part shaping on the face in different degrees.

With respect to face image morphing, face image mesh methods are commonly used, which include a triangulation method. In the triangulation method, multiple corresponding feature points are marked on a source image and a target image, and the whole image is divided into multiple triangle regions according to the feature points. In order to avoid splitting triangles with poor shape, the Delaunay triangulation is usually adopted by people.

In this regard, providing an image processing method by which good user experience can be achieved is an urgent technical problem to be solved.

SUMMARY

An object of the present disclosure is to provide an image processing method to at least partially solve a technical problem of how to improve user experience. In addition, there are further provided an image processing device, a hardware device for image processing, a computer readable storage medium, and an image processing terminal.

In order to achieve the above object, the following technical solutions are provided according to an aspect of the present disclosure.

An image processing method is provided, which includes: recognizing eye key points on a face image; performing interpolation to obtain auxiliary key points, where the auxiliary key points and the eye key points form a first triangulation mesh at a predetermined eye position on the face image; and transforming, based on the first triangulation mesh, an eye makeup effect image to the predetermined eye position. Further, the eye makeup effect image includes at least one of an eyelash, a double eyelid, a single eyelid, an eye shadow, and an eyeliner.

Further, before the recognizing eye key points on a face image, the method further includes: detecting the face image in response to an event of a user selecting the eye makeup effect image.

Further, the performing interpolation to obtain auxiliary key points includes:
acquiring a second triangulation mesh on a standard template corresponding to the first triangulation mesh, where the eye makeup effect image is drawn on the standard template; and
determining the auxiliary key points on the first triangulation mesh based on the second triangulation mesh, where the similarity between a triangle in the first triangulation mesh and a corresponding triangle in the second triangulation mesh is in a first preset error range.

Further, the determining the auxiliary key points on the first triangulation mesh based on the second triangulation mesh includes:
determining a first angle between a first connection line and a second connection line in the first triangulation mesh based on the second triangulation mesh, wherein the first connection line is a line connecting a first eye key point and a second eye key point that are adjacent to each other, and the second connection line is a line connecting the second eye key point and a first auxiliary key point, wherein the first eye key point, the second eye key point and the first auxiliary key point are three vertices of a first triangle in the first triangulation mesh;
determining a second angle between a third connection line and a fourth connection line based on the second triangulation mesh, wherein the third connection line is a line connecting the second eye key point and a third eye key point that are adjacent to each other, the fourth connection line is a line connecting the second eye key point and a second auxiliary key point, wherein the third eye key point, the second eye key point and the second auxiliary key point are three vertices of a second triangle in the first triangulation mesh; and
determining the first auxiliary key point and the second auxiliary key point based on the first angle, the second angle and the second triangulation mesh.

Further, the determining a first angle between a first connection line and a second connection line in the first triangulation mesh based on the second triangulation mesh includes:
determining a first corresponding triangle in the second triangulation mesh corresponding to the first triangle; and
determining the first angle, where a first difference value between the first angle and a first corresponding angle of the first corresponding triangle corresponding to the first angle is in a second preset error range.

Further, the determining a second angle between a third connection line and a fourth connection line based on the second triangulation mesh includes:
determining a second corresponding triangle in the second triangulation mesh corresponding to the second triangle; and
determining the second angle, where a second difference value between the second angle and a second corresponding angle of the second corresponding triangle corresponding to the second angle is in a second preset error range.

Further, the determining the first auxiliary key point and the second auxiliary key point based on the first angle, the second angle and the second triangulation mesh includes:
determining a first ratio between the first connection line and a first corresponding connection line in the second triangulation mesh corresponding to the first connection line; and determining the first auxiliary key point based on the first ratio and the first angle.

Further, the determining the first auxiliary key point and the second auxiliary key point based on the first angle, the second angle and the second triangulation mesh includes:

determining a second ratio between the third connection line and an edge in the second triangulation mesh corresponding to the third connection line; and determining the second auxiliary key point based on the second ratio and the second angle.

Further, a minimum value of the second preset error range is zero

Further, the method further includes:

determining an opening and closing degree of an eye on the face image based on the eye key points; and determining the first difference value and the second difference value based on the opening and closing degree.

Further, the determining the first difference value and the second difference value based on the opening and closing degree includes:

setting each of the first difference value and the second difference value as a minimum value of the second preset error range in a case that the opening and closing degree reaches a preset maximum value; and setting each of the first difference value and the second difference value as a maximum value of the second preset error range in a case that the opening and closing degree reaches a preset minimum value.

Further, the triangle in the second triangulation mesh is an equilateral triangle.

Further, the transforming an eye makeup effect image to the predetermined eye position based on the first triangulation mesh includes:

determining a correspondence relationship between the first triangulation mesh and the second triangulation mesh; and transforming, based on the correspondence relationship, the eye makeup effect image in the second triangulation mesh to the predetermined eye position on the face image in the first triangulation mesh.

In order to achieve the above object, the following technical solutions are provided according to another aspect of the present disclosure.

An image processing device is provided, which includes:

a recognition module configured to recognize eye key points on a face image;

an interpolation module configured to perform interpolation to obtain auxiliary key points, where the auxiliary key points and the eye key points form a first triangulation mesh at a predetermined eye position on the face image; and a transformation module configured to transform, based on the first triangulation mesh, an eye makeup effect image to the predetermined eye position.

Further, the eye makeup effect image includes at least one of an eyelash, a double eyelid, a single eyelid, an eye shadow, and an eyeliner.

Further, in addition to the recognition module, the image processing device further includes: a response module configured to detect the face image in response to an event of a user selecting the eye makeup effect image.

Further, the interpolation module includes:

an acquiring sub-module configured to acquire a second triangulation mesh on a standard template corresponding to the first triangulation mesh, where the eye makeup effect image is drawn on the standard template; and a first determining sub-module configured to determine the auxiliary key points on the first triangulation mesh based on the second triangulation mesh, where the similarity between a triangle in the first triangulation mesh and a corresponding triangle in the second triangulation mesh is in a first preset error range Further, the first determining module includes:

a second determining sub-module configured to determine between a first connection line and a second connection line in the first triangulation mesh based on the second triangulation mesh, wherein the first connection line is a line connecting a first eye key point and a second eye key point that are adjacent to each other, and the second connection line is a line connecting the second eye key point and a first auxiliary key point, wherein the first eye key point, the second eye key point and the first auxiliary key point are three vertices of a first triangle in the first triangulation mesh; and a third determining sub-module configured to determine a second angle between a third connection line and a fourth connection line based on the second triangulation mesh, where the third connection line is a line connecting the second eye key point and a third eye key point that are adjacent to each other, the fourth connection line is a line connecting the second eye key point and a second auxiliary key point, where the third eye key point, the second eye key point and the second auxiliary key point are three vertices of a second triangle in the first triangulation mesh; and a fourth determining sub-module configured to determine the first auxiliary key point and the second auxiliary key point based on the first angle, the second angle and the second triangulation mesh.

Further, the second determining sub-module includes:

a fifth determining sub-module configured to determine a first corresponding triangle in the second triangulation mesh corresponding to the first triangle; and a sixth determining sub-module configured to determine the first angle, where a first difference value between the first angle and a first corresponding angle of the first corresponding triangle corresponding to the first angle is in a second preset error range.

Further, the third determining sub-module includes:

a seventh determining sub-module configured to determine a second corresponding triangle in the second triangulation mesh corresponding to the second triangle; and an eighth determining sub-module configured to determining the second angle, where a second difference value between the second angle and a second corresponding angle of the second corresponding triangle corresponding to the second angle is in a second preset error range.

Further, the fourth determining sub-module includes:

a ninth determining sub-module configured to determine first ratio between the first connection line and a first corresponding connection line in the second triangulation mesh corresponding to the first connection line; and a tenth determining sub-module configured to determine the first auxiliary key point based on the first ratio and the first angle.

Further, the fourth determining sub-module includes:

an eleventh determining sub-module configured to determine a second ratio between the third connection line and an edge in the second triangulation mesh corresponding to the third connection line; and a twelfth determining sub-module configured to determine the second auxiliary key point based on the second ratio and the second angle.

Further, a minimum value of the second preset error range is zero.

Further, the image processing device further includes:

a first determining module configured to determine an opening and closing degree of an eye on the face image based on the eye key points; and a second determining module configured to determine the first difference value and the second difference value based on the opening and closing degree.

Further, the second determining module includes:

a first setting sub-module configured to set each of the first difference value and the second difference value as a minimum value of the second preset error range in a case that the opening and closing degree reaches a preset maximum value; and a second setting sub-module configured to set each of the first difference value and the second difference value as a maximum value of the second preset error range in a case that the opening and closing degree reaches a preset minimum value.

Further, the triangle in the second triangulation mesh is an equilateral triangle.

Further, the transformation module includes:

a thirteenth determining sub-module configured to determine a correspondence relationship between the first triangulation mesh and the second triangulation mesh; and a transformation sub-module configured to transform, based on the correspondence relationship, the eye makeup effect image in the second triangulation mesh to the predetermined eye position on the face image in the first triangulation mesh.

In order to achieve the above object, the following technical solutions are provided according to another aspect of the present disclosure.

A hardware device for image processing is provided. The hardware device includes:

a memory configured to store non-transitory computer readable instructions; and a processor configured to execute the computer readable instructions to perform any one of the image processing methods described above.

In order to achieve the above object, the following technical solutions are provided according to another aspect of the present disclosure.

A computer readable storage medium having stored thereon non-transitory computer readable instructions is provided. When executed by a computer, the non-transitory computer readable instructions cause the computer to perform any one of the image processing methods described above.

In order to achieve the above object, the following technical solutions are provided according to another aspect of the present disclosure.

An image processing terminal is provided, which includes any one of the image processing devices described above.

There are provided an image processing method, an image processing device, a hardware device for image processing, a computer readable storage medium, and an image processing terminal according to embodiments of the present disclosure. The image processing method includes: recognizing eye key points on a face image; performing interpolation to obtain auxiliary key points, where the auxiliary key points and the eye key points form a first triangulation mesh at a predetermined eye position on the face image; and transforming, based on the first triangulation mesh, an eye makeup effect image to the predetermined eye position. With the technical solutions according the embodiments of the present disclosure, the auxiliary key points are obtained around the eye of the face based on the eye key points on the face by performing interpolation, and the standard eye makeup effect image is transformed to the predetermined eye position on the face based on the triangulation mesh formed by the eye key points and the auxiliary key points on the face, so that the problem that the shape of the triangulation mesh greatly differs depending on different eye states of different people can be solved, thereby achieving the technical effect that expected eye makeup effect images are added for the different eye states of different people, and thus improving the user experience.

The above description is only an overview of the technical solutions of the present disclosure. In order to more clearly understand technical means used in the present disclosure to implement the present disclosure as stated in this specification, and to more clearly understood the above and other objects, features and advantages of the present disclosure, preferred embodiments are described in detail below with reference to the drawings.

DETAILED DESCRIPTION OF EMBODIMENTS

Figure 1:
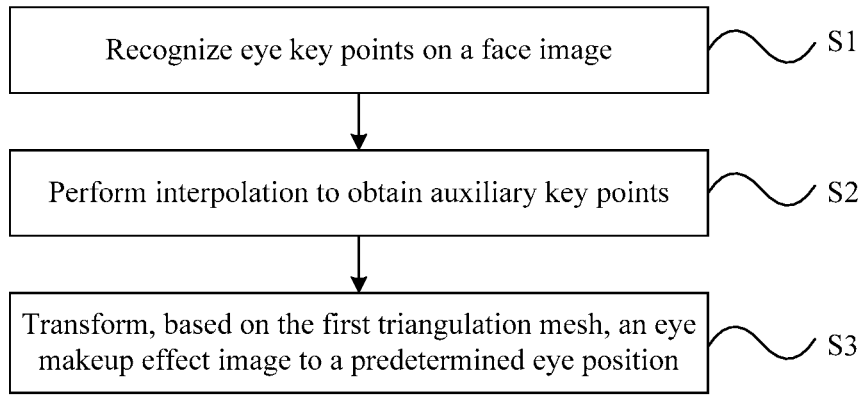
FIG. 1 is a schematic flow chart of an image processing method according to an embodiment of the present disclosure.

Embodiments of the present disclosure are described below by specific examples, and those skilled in the art may easily understand other advantages and effects of the present disclosure based on contents disclosed in this specification. It is apparent that the described embodiments are only a part of the embodiments of the present disclosure, rather than all embodiments. The present disclosure may be implemented or applied by various other specific embodiments, and various modifications and changes may be made to details of this specification based on different views and applications without departing from the spirit of the present disclosure. It should be noted that the following embodiments and features in the embodiments may be combined with each other without conflict. All other embodiments obtained by those skilled in the art based on the embodiments of the present disclosure without any creative work fall in the protection scope of the present disclosure.

It should be noted that various aspects of the embodiments within the scope of the appended claims are described below. It is apparent that, the aspects described herein may be embodied in a wide variety of forms, and any particular structure and/or function described herein is merely illustrative. Based on the present disclosure, those skilled in the art should appreciate that, one aspect described herein may be implemented independently of any other aspects and two or more of these aspects may be combined in various ways. For example, the device and/or method may be implemented using any number of the aspects set forth herein. In addition, the device and/or method may be implemented using other structures and/or functionalities than one or more of the aspects set forth herein.

It should further be noted that the drawings provided in the following embodiments merely illustrate the basic concept of the present disclosure in a schematic manner, and only components related to the present disclosure are shown in the drawings. The drawings are not drawn based on the number, the shape and the size of components in actual implementation. The type, the number and the proportion of the components may be changed randomly in the actual implementation, and a layout of the components may be more complicated.

In addition, in the following description, specific details are provided to facilitate a thorough understanding of the examples. However, those skilled in the art should appreciate that the aspects may be practiced without these specific details.

In the conventional technology, when performing eye makeup on an eye, each of a source image (a face image) and a target image (a standard template in which an eye makeup effect image is located) forms a triangulation mesh by combining eye key points with eyebrow key points, and the target image is transformed to the source image based on triangles at corresponding positions on triangulation meshes of the source image and the target image. However, different people have different eyebrow shapes, and particularly, some people may raise eyebrows at a certain part, that is, a position difference between eyebrow key points at the part and eyebrow key points at other parts is large. In this case, in the triangulation mesh formed by the eye key points and the eyebrow key points, the shape of the triangle formed by eyebrow key points at which the eyebrow is raised and the eye key points greatly differs from the shape of other triangles, so that the triangle formed by eyebrow key points at which the eyebrow is raised and the eye key points does not correspond to and greatly differs from a triangle at a corresponding position in the triangulation mesh on the standard template. The eye makeup effect image is drawn based on the triangulation mesh on the standard template. Therefore, in the process that the eye makeup effect image is transformed to a predetermined eye position on the face image according to the triangulation principle, distortion is easily caused. Further, in the process that the online beauty makeup is performed on the eye, since the state of the eye is constantly changing, the positional relationship between the eye and the eyebrow is also constantly changing, sometimes significantly changing (for example, the user raises the eyebrow), the eye makeup effect image cannot be dynamically adjusted on the face image according to the change of the eye state, affecting the user experience.

In order to solve the technical problem of how to improve the user experience, an image processing method is provided according to an embedment of the present disclosure. As shown in FIG. 1, the image processing method mainly includes the following steps S1 to S3.

In step S1, eye key points on a face image are recognized.

The face image may be an offline face image obtained by performing face recognition, or may be a face image that is online recognized, which is not limited in the present disclosure. The eye key points may be key points at an eye position that is obtained by performing face feature key point detection, for example, two key points respectively at a left eye corner and a right eye corner, one or more key points distributed on an upper eyelid, and one or more key points distributed on a lower eyelid. The eye key points may be used to identify an eye contour.

In step S2, interpolation is performed to obtain auxiliary key points. The auxiliary key points and the eye key points form a first triangulation mesh at a predetermined eye position on the face image.

The triangulation is a process in which multiple key points are marked on the face image, the whole face image is divided into multiple triangle regions according to the key points, and the multiple triangle regions are connected to form a triangulation mesh. The auxiliary key points obtained by performing the interpolation and the eye key points are vertices of a triangular region in the triangulation mesh. In a case that the eye key points are known, the auxiliary key points may be obtained by performing interpolation with a triangulation method according to actual needs. In the first triangulation mesh, the eye key point or the auxiliary key point may be a vertex of a triangle region, or a common vertex between two adjacent triangle regions, or a common vertex between three adjacent triangle regions, which is determined by a position of the eye key point or the auxiliary key point in the first triangulation mesh.

In step S3, based on the first triangulation mesh, an eye makeup effect image is transformed to the predetermined eye position.

The eye makeup effect image may be an image preset by a system. The triangulation is in advance performed on the eye makeup effect image to obtain a relationship between corresponding triangles, and the eye makeup effect image is transformed to the predetermined eye position on the face image based on the relationship between corresponding triangles.

For ease of understanding, the process of image processing is described in detail below with reference to specific embodiments.

In an embodiment, in a process that a user online or offline performs eye makeup on his own face image or someone else's face image by using an image processing system, the user may select a favorite eye makeup effect image from multiple standard templates preset by the image processing system, and trigger the transformation process of the eye makeup effect image to the face image by a dragging operation or by pressing a corresponding button. In other embodiments, the image processing system may automatically perform eye makeup on the face image, which is not limited in the present disclosure. The image processing system firstly acquires a face image to be processed, and performs face detection on the face image. If a face region is detected, the image processing system detects key points on the face, and acquires eye key points on the face image.

In an embodiment, all key points on the face image may be detected, including key points at positions such as eyebrows, a nose, a mouth, eyes, and a face contour. In another embodiment, the key points at the predetermined eye position are only detected.

In an embodiment, the eye key points may include two key points respectively at a left eye corner and a right eye corner, a key point at the uppermost of an upper eyelid and two key points respectively on left and right sides of the key point, and a key point at the lowermost of an lower eyelid and two key points respectively on left and right sides of the key point, i.e., eight key points in total. In other embodiments, fewer or more eye key points may be acquired according to actual needs and the used face key point detection method, which is not limited in the present disclosure.

After the eye key points are detected, interpolation may be performed according to the principle of triangulation and the eye makeup effect image selected by the user to obtain auxiliary key points. Positions of the auxiliary key points may be selected based on the positions of the eye key points. The auxiliary key points may be selected around the eye contour, for example, on the upper eyelid, the lower eyelid, and a lateral extension line of the eye corner, and the auxiliary key points and the eye key points form a first triangulation mesh. The first triangulation mesh includes multiple triangles, and a vertex of each triangle is the eye key point or the auxiliary key point. Since the auxiliary key point is located on the upper eyelid, the lower eyelid or the lateral extension line of the eye corner, a lifting movement of the eyebrow on the face image does not cause a large shape change of the triangle in the first triangulation mesh. Therefore, in the process that the eye makeup effect image is transformed to the predetermined eye position based on the first triangulation mesh, no distortion similar to that in the conventional technology is generated, greatly improving the user experience.

In this embodiment, with the above technical solution, the auxiliary key points are obtained around the eye of the face based on the eye key points on the face by performing interpolation, and the standard eye makeup effect image is transformed to the predetermined eye position on the face based on the triangulation mesh formed by the eye key points and the auxiliary key points on the face, so that the problem that the shape of the triangulation mesh greatly differs depending on different eye states of different people can be solved, thereby achieving the technical effect that expected eye makeup effect images are added for the different eye states of different people, and thus improving the user experience.

In an optional embodiment, the eye makeup effect image includes at least one of an eyelash, a double eyelid, a single eyelid, an eye shadow, and an eyeliner.

In this optional embodiment, at least one of the eyelash, the double eyelid, the single eyelid, the eye shadow, the eyeliner, and the like may be automatically transformed for the face image by the image processing system, and the transformed effect is the same as that on the standard template without generating the distortion, greatly improving the user experience.

In an optional embodiment, before the process of recognizing the eye key points on the face image in step S1, the method may further include: detecting the face image in response to an event of a user selecting the eye makeup effect image.

In this optional embodiment, the image processing system may provide multiple eye makeup effect images in advance, which are designed on a standard template preset by the image processing system. The user may add an eye makeup effect to the face image by the image processing system. After the user selects an eye makeup effect image provided by the image processing system, the image processing system may firstly acquire a picture or a video frame to which the user is to add the eye makeup effect. The user may upload a picture including a face image via an interface provided by the image processing system, and perform offline processing on the face image on the picture. Alternatively, the image processing system may acquire an avatar video frame of the user in real time via a camera, and perform online processing on the avatar video frame.

Whether the offline processing or the online processing is performed, after the user selects the eye makeup effect image, the face image is detected from the picture or the video frame. The process of detecting the face image is to determine whether there is a face in the picture or the video frame to be detected. If there is a face in the picture or the video frame to be detected, a size, a location, and the like of the face are returned. There are many methods for detecting a face image, for example, a skin color detection method, a motion detection method and an edge detection method. There are also many related models, which is not limited in the present disclosure. Any method for detecting a face image may be applied to the embodiment of the present disclosure to perform detection on the face image. Further, if it is detected that there are multiple faces in the current picture or the current video frame, a face image is generated for each of the multiple faces.

In this optional embodiment, taking the user selecting the eye makeup effect image as a trigger event, the image processing is performed to add an eye makeup effect image to a user-specified face image, which can add interest to the user and improve the user experience.

Figure 2:
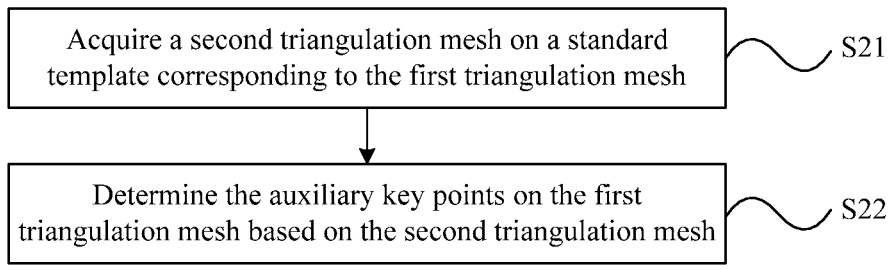
FIG. 2 is a schematic flow chart showing a process of step S2 shown in FIG. 1 in the embodiment.

In an optional embodiment, as shown in FIG. 2, the process of performing the interpolation to obtain the auxiliary key points in step S2 may include the following steps S21 and S22.

In step S21, a second triangulation mesh on a standard template corresponding to the first triangulation mesh is acquired. The eye makeup effect image is drawn on the standard template.

In step S22, the auxiliary key points on the first triangulation mesh are determined based on the second triangulation mesh. The similarity between a triangle in the first triangulation mesh and a corresponding triangle in the second triangulation mesh is in a first preset error range.

In this optional embodiment, the eye makeup effect image is drawn on the standard template of the image processing system. The standard template includes a standard face image which is triangulated in advance to form the second triangulation mesh. That is, the eye makeup effect image is correspondingly drawn in the second triangulation mesh.

In order to transform the eye makeup effect image onto the detected face image, and in order to avoid the distortion of the eye makeup effect image due to the difference between the face image detected after the transformation and the standard face image on the standard template, the auxiliary key points may be obtained based on the second triangulation mesh on the standard template, so that corresponding triangles in the first triangulation mesh and the second triangulation mesh are as similar as possible, that is, the similarity between the corresponding triangles in the first triangulation mesh and the second triangulation mesh is controlled in the first preset error range. The corresponding triangles refer to a triangle on a certain part of the detected face image and a triangle at a corresponding part on the standard face image. The following description is given by taking the right eye as an example. On the detected face image, an eye key point on an outer eye corner, an auxiliary key point on a lateral extension line of the outer eye corner, and another auxiliary key point above the auxiliary key point form a triangle a. On the standard face image, an eye key point on an outer eye corner, an auxiliary key point on a lateral extension line of the outer eye corner, and another auxiliary key point above the auxiliary key point form a triangle b. In this case, the triangle a and the triangle b are corresponding triangles. A small first preset error range corresponds to a high similarity between the corresponding triangles in the first triangulation mesh and the second triangulation mesh. The value of the first preset error range may be set according to actual conditions, which is not limited in the present disclosure.

In this optional embodiment, the auxiliary key points are selected so that the corresponding triangles in the first triangulation mesh and the second triangulation mesh are as similar as possible. In this way, the eye makeup effect image drawn on the second triangulation mesh can be added to the eye position on the face image where the first triangulation mesh is located, without causing the distortion of the eye makeup effect image due to the difference in the eye on the face image or different eye states, improving the user experience.

Figure 3:
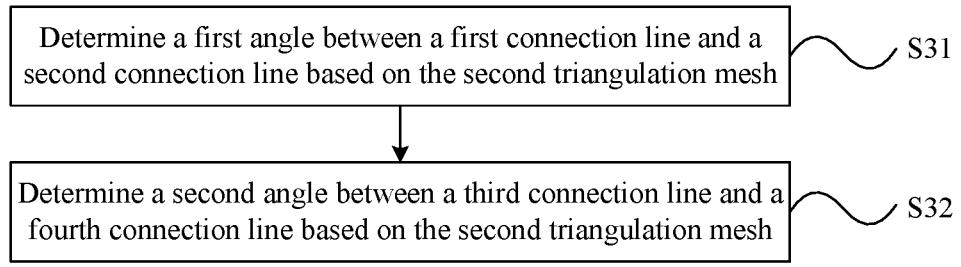
FIG. 3 is a schematic flow chart showing a process of step S22 shown in FIG. 2 in the embodiment.

In an optional embodiment, as shown in FIG. 3, the process of determining the auxiliary key points on the first triangulation mesh based on the second triangulation mesh in step S22 may include the following steps S31 to S33.

In step S31, a first angle between a first connection line and a second connection line in the first triangulation mesh is determined based on the second triangulation mesh. The first connection line is a line connecting a first eye key point and a second eye key point that are adjacent to each other. The second connection line is a line connecting the second eye key point and a first auxiliary key point. The first eye key point, the second eye key point and the first auxiliary key point are three vertices of a first triangle in the first triangulation mesh.

In step S32, a second angle between a third connection line and a fourth connection line is determined based on the second triangulation mesh. The third connection line is a line connecting the second eye key point and a third eye key point that are adjacent to each other. The fourth connection line is a line connecting the second eye key point and a second auxiliary key point. The second eye key point, the third eye key point and the second auxiliary key point are three vertices of a second triangle in the first triangulation mesh.

In step S33, the first auxiliary key point and the second auxiliary key point are determined based on the first angle, the second angle and the second triangulation mesh.

In this optional embodiment, in the process of determining the auxiliary key points according to the principle that the corresponding triangles in the first triangulation mesh and the second triangulation mesh are as similar as possible, the size of a vertex angle of a triangle in the second triangulation mesh may be firstly determined, and the size of the corresponding vertex angle in the first triangulation mesh is determined according to the principle that the corresponding angles in the similar triangles are equal. Finally, in the case that the sizes of vertex angles of triangles in the first triangulation mesh are determined and the eye key points are used as vertices of the triangles, the auxiliary key points are determined.

For example, the first triangle and the second triangle in the first triangulation mesh are adjacent triangles. Two vertices of the first triangle are detected eye key points which respectively are the first eye key point and the second eye key point, the remaining vertex of the first triangle is the first auxiliary key point to be determined, and the first connection line in the first triangle is a line connecting the first eye key point and the second eye key point, and the second connection line in the first triangle is a line connecting the second eye key point and the first auxiliary key point. The second triangle is adjacent to the first triangle, two vertices of the second triangle are auxiliary key points which respectively are the first auxiliary key point and the second auxiliary key point, and the remaining vertex of the second triangle is the second eye key point. That is, the second triangle shares a common vertex with the first triangle.

The second triangulation mesh has two triangles respectively corresponding to the first triangle and the second triangle. Two vertices of a first corresponding triangle corresponding to the first triangle are eye key points on the standard face image, which may be obtained by the key point detection method in the process of establishing a standard template and performing triangulation on the standard template, and the remaining vertex of the first corresponding triangle is a first corresponding auxiliary key point selected around the eye contour. The first corresponding auxiliary key point is selected according to actual conditions. For example, the first corresponding auxiliary key point may be selected based on the principle that the second triangle is an equilateral triangle or an isosceles triangle. A second corresponding triangle corresponding to the second triangle shares two vertices with the first corresponding triangle, which respectively are one of the eye key points and the first corresponding auxiliary key point in the first corresponding triangle, and the remaining vertex of the second corresponding triangle is a selected second corresponding auxiliary key point. The second corresponding auxiliary key point is selected based on the same selection principle as the first corresponding auxiliary key point.

The second triangulation mesh is pre-established, that is, the corresponding auxiliary key points in the second triangulation mesh are pre-selected and pre-defined. In this case, in the process of determining the auxiliary key points on the first triangulation mesh, as long as two angles of the corresponding triangles in the second triangulation mesh are determined, the first angle of the first triangle and the second angle of the second triangle in the first triangulation mesh are determined.

In the case that the second triangulation mesh is determined, the first auxiliary key point and the second auxiliary key point may be determined based on the first angle, the second angle and the second triangulation mesh according to the triangle similarity principle. Auxiliary key points in other triangles in the first triangulation mesh may be determined according to the same principle.

In an optional embodiment, the process of determining the first angle between the first connection line and the second connection line based on the second triangulation mesh in step S31 may include:

determining a first corresponding triangle in the second triangulation mesh corresponding to the first triangle; and determining the first angle, where a first difference value between the first angle and an angle of the first corresponding triangle corresponding to the first angle is in a second preset error range.

In this optional embodiment, the first triangulation mesh and the second triangulation mesh have corresponding triangles, that is, the triangles of the corresponding parts in the face image are almost or completely similar to each other. Therefore, in the case that the second triangulation mesh is determined, the first corresponding triangle corresponding to the first triangle in the first triangulation mesh is firstly determined, and the first angle of the first triangle is determined based on the first corresponding triangle according to the triangle similarity principle. For example, in a case that the first triangle is completely similar to the first corresponding triangle, the first difference value between the first angle and a first corresponding angle in the first corresponding triangle corresponding to the first angle may be equal to zero. However, in actual operation, the corresponding triangles in the first triangulation mesh and the second triangulation mesh may be not completely similar. In this case, the same effect can be achieved by causing the corresponding triangles in the first triangulation mesh and the second triangulation mesh to be as similar as possible. Therefore, in the process of determining the first angle, a certain error between the first angle and the first corresponding angle is allowed, as long as the error is controlled in the second preset error range. The second preset error range may be set according to actual conditions. For example, the second preset error range may be a range of [0, α], where α may be 20 degrees, which is not limited herein.

In an optional embodiment, the process of determining the second angle between the third connection line and the fourth connection line based on the second triangulation mesh in step S32 may include:

determining a second corresponding triangle in the second triangulation mesh corresponding to the second triangle; and determining the second angle, where a second difference value between the second angle and a second corresponding angle of the second corresponding triangle corresponding to the second angle is in a second preset error range.

In this optional embodiment, the second angle is determined in a manner similar to that of the first angle. The first triangulation mesh and the second triangulation mesh have corresponding triangles, that is, the triangles of the corresponding parts in the face image are almost or completely similar to each other. Therefore, in the case that the second triangulation mesh is determined, the second corresponding triangle corresponding to the second triangle in the first triangulation mesh is firstly determined, and the second angle of the second triangle is determined based on the second corresponding triangle according to the triangle similarity principle. For example, in a case that the second triangle is completely similar to the second corresponding triangle, the first difference value between the second angle and the second corresponding angle in the second corresponding triangle may be equal to zero. However, in actual operation, the corresponding triangles in the first triangulation mesh and the second triangulation mesh may be not completely similar. In this case, the same effect can be achieved by causing the corresponding triangles in the first triangulation mesh and the second triangulation mesh to be as similar as possible. Therefore, in the process of determining the second angle, a certain error between the second angle and the second corresponding angle is allowed, as long as the error is controlled in the second preset error range. The second preset error range may be set according to actual conditions. For example, the second preset error range may be a range of [0, α], where α may be 20 degrees, which is not limited herein.

In an optional embodiment, the process of determining the first auxiliary key point and the second auxiliary key point based on the first angle, the second angle and the second triangulation mesh in step S33 may include:

determining a first ratio between the first connection line and an edge in the second triangulation mesh corresponding to the first connection line; and determining the first auxiliary key point based on the first ratio and the first angle.

In this optional embodiment, in a case that one edge and an angle on the edge are determined, the other edge forming the angle may be determined based on a ratio between corresponding edges of the similar triangles according to the triangle similarity principle.

For example, in this embodiment, the first connection line is a line connecting two eye key points on the first triangle in the first triangulation mesh. In this case, the length of the first connection line is determined, and the length of the edge of the first corresponding triangle corresponding to the first connection line of the first triangle is determined. That is, the first ratio between the first connection line and the edge corresponding to the first connection line may be determined. Therefore, the first auxiliary key point may be determined based on the first ratio and the first angle on the first connection line according to the triangle similarity principle.

In an optional embodiment, the process of determining the first auxiliary key point and the second auxiliary key point based on the first angle, the second angle and the second triangulation mesh in step S33 may include determining a second ratio between the third connection line and an edge in the second triangulation mesh corresponding to the third connection line; and determining the second auxiliary key point based on the second ratio and the second angle.

In this optional embodiment, in a case that one edge and an angle on the edge are determined, the other edge forming the angle may be determined based on a ratio between corresponding edges of the similar triangles according to the triangle similarity principle, which is similar to that of the first auxiliary key point.

For example, in this embodiment, the third connection line is a line connecting an eye key point and the first auxiliary key point on the second triangle in the first triangulation mesh. In this case, after the first auxiliary key point is determined, the length of the third connection line is determined, and the length of the edge of the second corresponding triangle corresponding to the third connection line of the second triangle is determined. That is, the second ratio between the third connection line and the edge corresponding to the third connection line may be determined. Therefore, the second auxiliary key point may be determined based on the second ratio and the second angle on the third connection line according to the triangle similarity principle.

In an optional embodiment, a minimum value of the second preset error range is zero.

In this optional embodiment, if the corresponding triangles in the first triangulation mesh and the second triangulation mesh are kept as similar as possible, the eye makeup effect image can be transformed to the face image, and the best effect can be achieved. In this case, it may be considered that the first triangle is completely similar to the first corresponding triangle, and the error between the first angle and the first corresponding angle is zero. It may further be considered that the second triangle is completely similar to the second corresponding triangle, and the error between the second angle and the second corresponding angle is zero. The eye on the standard face image on the standard template is typically always in an opening state. However, in the actual application process, the state of the eye on the detected face image changes constantly. That is, the eye may be in an opening state at a time instant, and may be in an opening state at another time instant. Therefore, for example, in the case that the eye is in the closing state, the corresponding triangles in the first triangulation mesh and the second triangulation mesh may not be completely similar, and the error between the corresponding angles is also not zero. In order to ensure the effect, the error may be kept in the second preset error range.

In an optional embodiment, the image processing method may further include:

determining an opening and closing degree of an eye on the face image based on the eye key points; and determining the first difference value and the second difference value based on the opening and closing degree.

In this optional embodiment, in the standard face image on the standard template pre-established by the image processing system, the eye is typically completely opened, and the opening and closing degree of the eye in this case may be set to be largest. In the case that the eye is closed, the opening and closing degree may be considered to be smallest. Therefore, taking the standard template as a reference, if the opening and closing degree of the eye on the detected face image is consistent with the opening and closing degree of the eye on the standard face image, the corresponding triangles in the first triangulation mesh and the second triangulation mesh may be considered to be most similar to each other, and the error between the corresponding angles is smallest, that is, the first difference value and the second difference value are smallest. In addition, if the opening and closing degree of the eye on the detected face image is small, the similarity between the corresponding triangles in the first triangulation mesh and the second triangulation mesh is small, and the error between the corresponding angles is large, that is, the first difference value and the second difference value are large. It should be noted that the first difference value and the second difference value may be equal or not equal to each other, as long as both the first difference value and the second difference value are in the second preset error range.

The opening and closing degree of the eye may be determined by positions of the eye key points. For example, the opening and closing degree of the eye is determined by a difference between ordinates of the eye key point having the largest ordinate on the eyelid and the eye key point on the eye corner, among the eye key points. A large difference corresponds to a large opening and closing degree, and a small difference corresponds to a small opening and closing degree.

In an optional embodiment, the step of determining the first difference value and the second difference value based on the opening and closing degree may include:

setting each of the first difference value and the second difference value as a minimum value of the second preset error range in a case that the opening and closing degree reaches a preset maximum value; and setting each of the first difference value and the second difference value as a maximum value of the second preset error range in a case that the opening and closing degree reaches a preset minimum value.

In this optional embodiment, in the case that the opening and closing degree of the eye on the detected face image is largest, that is, in the case that the opening and closing degree of the eye on the detected face image is consistent with the opening and closing degree of the eye in the standard template, the difference between the angle of the triangle in the first triangulation mesh and the corresponding angle of the corresponding triangle in the second triangulation mesh may be set to be the minimum value of the second preset error range, that is, the corresponding triangles in the first triangulation mesh and the second triangulation mesh are most similar to each other. In addition, in the case that the opening and closing degree of the eye on the detected face image is smallest, the difference between the angle of the triangle in the first triangulation mesh and the corresponding angle of the corresponding triangle in the second triangulation mesh may be set to be the maximum value of the second preset error range, that is, the similarity error between the corresponding triangles in the first triangulation mesh and the second triangulation mesh reaches a maximum value. Therefore, the first difference value and the second difference value may be set to be the minimum value in the case that the eye on the face image is in a completely opening state, and the first difference value and the second difference value may be set to be the maximum value in the case that the eye on the face image is in the closing state.

In an optional embodiment, the triangles in the second triangulation mesh are equilateral triangles.

In this optional embodiment, the triangles in the second triangulation mesh on the standard template are all equilateral triangles, that is, the angles of the triangles are all 60 degrees. In this case, in the corresponding triangle on the first triangulation mesh, the size of the angle with the eye key point as a vertex may be set to be 60 degrees plus an error in the second preset error range, where the error varies with the opening and closing degree of the eyes on the detected face image. In this way, the transformation of the eye makeup effect image can be achieved with a good effect with the image processing method according to the present embodiment, not easily generating the distortion.

In an optional embodiment, the process of transforming the eye makeup effect image to the predetermined eye position based on the first triangulation mesh in step S3 may include:

determining a correspondence relationship between the first triangulation mesh and the second triangulation mesh; and transforming, based on the correspondence relationship, the image in the second triangulation mesh to the image in the first triangulation mesh.

In this optional embodiment, after the auxiliary key points are determined, the first triangulation mesh is formed at the predetermined eye position on the face image. In the process of transforming the eye makeup effect image on the standard template to the detected face image, based on the correspondence relationship between the first triangulation mesh and the second triangulation mesh, that is, a correspondence relationship between vertex coordinates of the corresponding triangles in the first triangulation mesh and the second triangulation mesh, the image in each triangle region in the second triangulation mesh is transformed into a corresponding triangle region in the first triangulation mesh based on the coordinate correspondence relationship, thereby achieving the transformation of the eye makeup effect image.

In the above, although various steps in the embodiments of the image processing method are described in the above-described order, those skilled in the art should understand that, the steps in the embodiments of the present disclosure are not necessarily performed in the above order, and may also be performed in the reversed order, in parallel, alternately, or the like. Other steps may be added to the above steps by those skilled in the art. These significant variations or equivalents are also included in the protection scope of the present disclosure, which is not repeated herein.

A device embodiment of the present disclosure is described in the following. The device embodiment of the present disclosure may be used to perform the steps of the method embodiments of the present disclosure. For the convenience of description, only parts related to the embodiments of the present disclosure are shown, and specific technical details are not shown, which refers to the method embodiments of the present disclosure.

Figure 4:
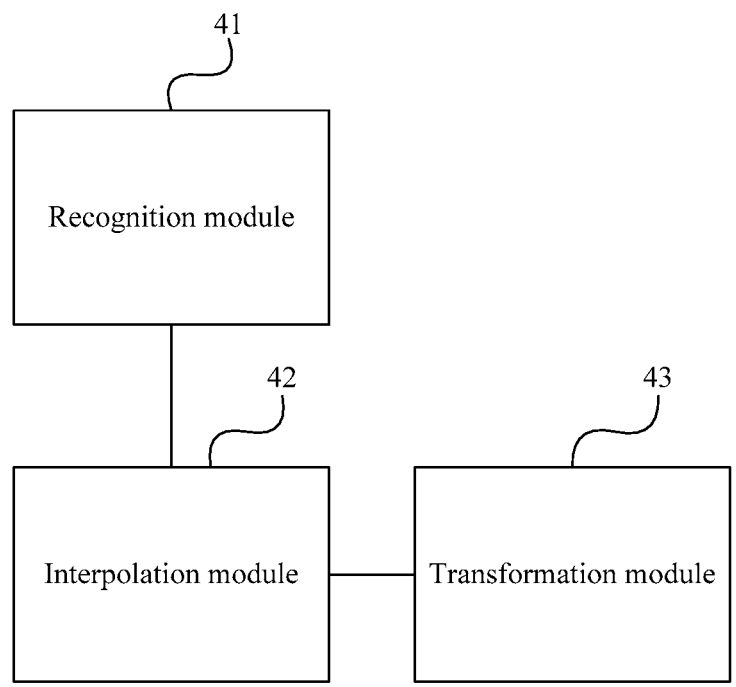
FIG. 4 is a schematic structural diagram of an image processing device according to an embodiment of the present disclosure.

In order to solve the technical problem of how to improve the user experience, an image processing device is provided according to an embodment of the present disclosure. The device may perform the steps in the embodiments of the image processing method described above. As shown in FIG. 4, the device mainly includes a recognition module 41, an interpolation module 42, and a transformation module 43. The recognition module 41 is configured to recognize eye key points on a face image. The interpolation module 42 is configured to perform interpolation to obtain auxiliary key points. The auxiliary key points and the eye key points form a first triangulation mesh at a predetermined eye position on the face image. The transformation module 43 is configured to transform, based on the first triangulation mesh, an eye makeup effect image to the predetermined eye position.

The face image may be an offline face image obtained by performing face recognition, or may be a face image that is online recognized, which is not limited in the present disclosure. The eye key points may be key points at an eye position that is obtained by performing face feature key point detection, for example, two key points respectively at a left eye corner and a right eye corner, one or more key points distributed on an upper eyelid, and one or more key points distributed on a lower eyelid. The eye key points may be used to identify an eye contour.

The triangulation is a process in which multiple key points are marked on the face image, the whole face image is divided into multiple triangle regions according to the key points, and the multiple triangle regions are connected to form a triangulation mesh. The auxiliary key points obtained by performing the interpolation and the eye key points are vertices of a triangular region in the triangulation mesh. In a case that the eye key points are known, the interpolation module 42 may obtain the auxiliary key points by performing interpolation with a triangulation method according to actual needs. In the first triangulation mesh, the eye key point or the auxiliary key point may be a vertex of a triangle region, or a common vertex between two adjacent triangle regions, or a common vertex between three adjacent triangle regions, which is determined by a position of the eye key point or the auxiliary key point in the first triangulation mesh.

The eye makeup effect image may be an image preset by a system. The triangulation is in advance performed on the eye makeup effect image to obtain a relationship between corresponding triangles, and the eye makeup effect image is copied to the predetermined eye position on the face image based on the relationship between corresponding triangles.

For ease of understanding, the process of image processing is described in detail below with reference to specific embodiments.

In In an embodiment, in a process that a user online or offline performs eye makeup on his own face image or someone else's face image by using an image processing system, the user may select a favorite eye makeup effect image from multiple standard templates preset by the image processing system, and trigger the transformation process of the eye makeup effect image to the face image by a dragging operation or by pressing a corresponding button. In other embodiments, the image processing system may automatically perform eye makeup on the face image, which is not limited in the present disclosure. The image processing system firstly acquires a face image to be processed, and performs face detection on the face image. If a face region is detected, the image processing system detects key points on the face, and acquires eye key points on the face image.

In an embodiment, the recognition module 41 may detect all key points on the face image, including key points at positions such as eyebrows, a nose, a mouth, eyes, and a face contour. In another embodiment, the recognition module 41 may detect only the key points at the predetermined eye position.

In an embodiment, the eye key points may include two key points respectively at a left eye corner and a right eye corner, a key point at the uppermost of an upper eyelid and two key points respectively on left and right sides of the key point, and a key point at the lowermost of an lower eyelid and two key points respectively on left and right sides of the key point, i.e., eight key points in total. In other embodiments, fewer or more eye key points may be acquired according to actual needs and the used face key point detection method, which is not limited in the present disclosure.

After the recognition module 41 detects the eye key points, the interpolation module 42 may perform interpolation according to the principle of triangulation and the eye makeup effect image selected by the user to obtain auxiliary key points. Positions of the auxiliary key points may be selected based on the positions of the eye key points. The auxiliary key points may be selected around the eye contour, for example, on the upper eyelid, the lower eyelid, and a lateral extension line of the eye corner, and the auxiliary key points and the eye key points form a first triangulation mesh. The first triangulation mesh includes multiple triangles, and a vertex of each triangle is the eye key point or the auxiliary key point. Since the auxiliary key point is located on the upper eyelid, the lower eyelid or the lateral extension line of the eye corner, a lifting movement of the eyebrow on the face image does not cause a large shape change of the triangle in the first triangulation mesh. Therefore, in the process that the eye makeup effect image is transformed to the predetermined eye position based on the first triangulation mesh, no distortion similar to that in the conventional technology is generated, greatly improving the user experience.

In this embodiment, with the above technical solution, the auxiliary key points are obtained around the eye of the face based on the eye key points on the face by performing interpolation, and the standard eye makeup effect image is transformed to the predetermined eye position on the face based on the triangulation mesh formed by the eye key points and the auxiliary key points on the face, so that the problem that the shape of the triangulation mesh greatly differs depending on different eye states of different people can be solved, thereby achieving the technical effect that expected eye makeup effect images are added for the different eye states of different people, and thus improving the user experience.

In an optional embodiment, the eye makeup effect image includes at least one of an eyelash, a double eyelid, a single eyelid, an eye shadow, and an eyeliner.

In this optional embodiment, at least one of the eyelash, the double eyelid, the single eyelid, the eye shadow, the eyeliner, and the like may be automatically transformed for the face image by the image processing system, and the transformed effect is the same as that on the standard template without generating the distortion, greatly improving the user experience.

In an optional embodiment, in addition to the recognition module 51, the image processing device may further include: a response module configured to detect the face image in response to an event of a user selecting the eye makeup effect image.

In this optional embodiment, the image processing system may provide multiple eye makeup effect images in advance, which are designed on a standard template preset by the image processing system. The user may add an eye makeup effect to the face image by the image processing system. After the user selects an eye makeup effect image provided by the image processing system, the image processing system may firstly acquire a picture or a video frame to which the user is to add the eye makeup effect. The user may upload a picture including a face image via an interface provided by the image processing system, and perform offline processing on the face image on the picture. Alternatively, the image processing system may acquire an avatar video frame of the user in real time via a camera, and perform online processing on the avatar video frame. Whether the offline processing or the online processing is performed, after the user selects the eye makeup effect image, the response module detects the face image from the picture or the video frame. The process of detecting the face image is to determine whether there is a face in the picture or the video frame to be detected. If there is a face in the picture or the video frame to be detected, a size, a location, and the like of the face are returned. There are many methods for detecting a face image, for example, a skin color detection method, a motion detection method and an edge detection method. There are also many related models, which is not limited in the present disclosure. Any method for detecting a face image may be applied to the embodiment of the present disclosure to perform detection on the face image. Further, if it is detected that there are multiple faces in the current picture or the current video frame, a face image is generated for each of the multiple faces.

In this optional embodiment, taking the user selecting the eye makeup effect image as a trigger event, the image processing is performed to add an eye makeup effect image to a user-specified face image, which can add interest to the user and improve the user experience.

In an optional embodiment, the interpolation module 42 may include:

an acquiring sub-module configured to acquire a second triangulation mesh on a standard template corresponding to the first triangulation mesh, where the eye makeup effect image is drawn on the standard template; and a first determining sub-module configured to determine the auxiliary key points on the first triangulation mesh based on the second triangulation mesh, where the similarity between a triangle in the first triangulation mesh and a corresponding triangle in the second triangulation mesh is in a first preset error range.

In this optional embodiment, the eye makeup effect image is drawn on the standard template of the image processing system. The standard template includes a standard face image which is triangulated in advance to form the second triangulation mesh. That is, the eye makeup effect image is correspondingly drawn in the second triangulation mesh.

In order to transform the eye makeup effect image onto the detected face image, and in order to avoid the distortion of the eye makeup effect image due to the difference between the face image detected after the transformation and the standard face image on the standard template, the auxiliary key points may be obtained based on the second triangulation mesh on the standard template, so that corresponding triangles in the first triangulation mesh and the second triangulation mesh are as similar as possible, that is, the similarity between the corresponding triangles in the first triangulation mesh and the second triangulation mesh is controlled in the first preset error range. The corresponding triangles refer to a triangle on a certain part of the detected face image and a triangle at a corresponding part on the standard face image. The following description is given by taking the right eye as an example. On the detected face image, an eye key point on an outer eye corner, an auxiliary key point on a lateral extension line of the outer eye corner, and another auxiliary key point above the auxiliary key point form a triangle a. On the standard face image, an eye key point on an outer eye corner, an auxiliary key point on a lateral extension line of the outer eye corner, and another auxiliary key point above the auxiliary key point form a triangle b. In this case, the triangle a and the triangle b are corresponding triangles. A small first preset error range corresponds to a high similarity between the corresponding triangles in the first triangulation mesh and the second triangulation mesh. The value of the first preset error range may be set according to actual conditions, which is not limited in the present disclosure.

In this optional embodiment, the auxiliary key points are selected so that the corresponding triangles in the first triangulation mesh and the second triangulation mesh are as similar as possible. In this way, the eye makeup effect image drawn on the second triangulation mesh can be added to the eye position on the face image where the first triangulation mesh is located, without causing the distortion of the eye makeup effect image due to the difference in the eye on the face image or different eye states, improving the user experience.

In an optional embodiment, the first determining module may include:

a second determining sub-module configured to determine a first angle between a first connection line and a second connection line in the first triangulation mesh based on the second triangulation mesh, where the first connection line is a line connecting a first eye key point and a second eye key point that are adjacent to each other, the second connection line is a line connecting the second eye key point and a first auxiliary key point, and the first eye key point, the second eye key point and the first auxiliary key point are three vertices of a first triangle in the first triangulation mesh; and a third determining sub-module configured to determine a second angle between a third connection line and a fourth connection line based on the second triangulation mesh, where the third connection line is a line connecting the second eye key point and a third eye key point that are adjacent to each other, the fourth connection line is a line connecting the second eye key point and a second auxiliary key point, and the second eye key point, the third eye key point and the second auxiliary key point are three vertices of a second triangle in the first triangulation mesh; and a fourth determining sub-module configured to determine the first auxiliary key point and the second auxiliary key point based on the first angle, the second angle and the second triangulation mesh.

In this optional embodiment, in the process of determining the auxiliary key points according to the principle that the corresponding triangles in the first triangulation mesh and the second triangulation mesh are as similar as possible, the size of a vertex angle of a triangle in the second triangulation mesh may be firstly determined, and the size of the corresponding vertex angle in the first triangulation mesh is determined according to the principle that the corresponding angles in the similar triangles are equal. Finally, in the case that the sizes of vertex angles of triangles in the first triangulation mesh are determined and the eye key points are used as vertices of the triangles, the auxiliary key points are determined.

For example, the first triangle and the second triangle in the first triangulation mesh are adjacent triangles. Two vertices of the first triangle are detected eye key points which respectively are the first eye key point and the second eye key point, the remaining vertex of the first triangle is the first auxiliary key point to be determined, and the first connection line in the first triangle is a line connecting the first eye key point and the second eye key point, and the second connection line in the first triangle is a line connecting the second eye key point and the first auxiliary key point. The second triangle is adjacent to the first triangle, two vertices of the second triangle are auxiliary key points which respectively are the first auxiliary key point and the second auxiliary key point, and the remaining vertex of the second triangle is the second eye key point. That is, the second triangle shares a common vertex with the first triangle.

The second triangulation mesh has two triangles respectively corresponding to the first triangle and the second triangle. Two vertices of a first corresponding triangle corresponding to the first triangle are eye key points on the standard face image, which may be obtained by the key point detection method in the process of establishing a standard template and performing triangulation on the standard template, and the remaining vertex of the first corresponding triangle is a first corresponding auxiliary key point selected around the eye contour. The first corresponding auxiliary key point is selected according to actual conditions. For example, the first corresponding auxiliary key point may be selected based on the principle that the second triangle is an equilateral triangle or an isosceles triangle. A second corresponding triangle corresponding to the second triangle shares two vertices with the first corresponding triangle, which respectively are one of the eye key points and the first corresponding auxiliary key point in the first corresponding triangle, and the remaining vertex of the second corresponding triangle is a selected second corresponding auxiliary key point. The second corresponding auxiliary key point is selected based on the same selection principle as the first corresponding auxiliary key point.

The second triangulation mesh is pre-established, that is, the corresponding auxiliary key points in the second triangulation mesh are pre-selected and pre-defined. In this case, in the process of determining the auxiliary key points on the first triangulation mesh, as long as two angles of the corresponding triangles in the second triangulation mesh are determined, the first angle of the first triangle and the second angle of the second triangle in the first triangulation mesh are determined.

In the case that the second triangulation mesh is determined, the first auxiliary key point and the second auxiliary key point may be determined based on the first angle, the second angle and the second triangulation mesh according to the triangle similarity principle. Auxiliary key points in other triangles in the first triangulation mesh may be determined according to the same principle.

In an optional embodiment, the second determining sub-module may include:

a fifth determining sub-module configured to determine a first corresponding triangle in the second triangulation mesh corresponding to the first triangle; and a fifth determining sub-module configured to determine the first angle, where a first difference value between the first angle and an angle of the first corresponding triangle corresponding to the first angle is in a second preset error range.

In this optional embodiment, the first triangulation mesh and the second triangulation mesh have corresponding triangles, that is, the triangles of the corresponding parts in the face image are almost or completely similar to each other. Therefore, in the case that the second triangulation mesh is determined, the fifth determining sub-module firstly determines the first corresponding triangle corresponding to the first triangle in the first triangulation mesh, and the sixth determining sub-module may determine the first angle of the first triangle based on the first corresponding triangle according to the triangle similarity principle. For example, in a case that the first triangle is completely similar to the first corresponding triangle, the first difference value between the first angle and a first corresponding angle in the first corresponding triangle corresponding to the first angle may be equal to zero. However, in actual operation, the corresponding triangles in the first triangulation mesh and the second triangulation mesh may be not completely similar. In this case, the same effect can be achieved by causing the corresponding triangles in the first triangulation mesh and the second triangulation mesh to be as similar as possible. Therefore, in the process of determining the first angle, a certain error between the first angle and the first corresponding angle is allowed, as long as the error is controlled in the second preset error range. The second preset error range may be set according to actual conditions. For example, the second preset error range may be a range of $[0, \alpha]$, where $\alpha$ may be 20 degrees, which is not limited herein.

In an optional embodiment, the third determining sub-module may include:

a seventh determining sub-module configured to determine a second corresponding triangle in the second triangulation mesh corresponding to the second triangle; and an eighth determining sub-module configured to determine the second angle, where a second difference value between the second angle and a second corresponding angle of the second corresponding triangle corresponding to the second angle is in a second preset error range.

In this optional embodiment, the second angle is determined in a manner similar to that of the first angle. The first triangulation mesh and the second triangulation mesh have corresponding triangles, that is, the triangles of the corresponding parts in the face image are almost or completely similar to each other. Therefore, in the case that the second triangulation mesh is determined, the seventh determining sub-module firstly determines the second corresponding triangle corresponding to the second triangle in the first triangulation mesh, and the eighth determining sub-module determines the second angle of the second triangle based on the second corresponding triangle according to the triangle similarity principle. For example, in a case that the second triangle is completely similar to the second corresponding triangle, the first difference value between the second angle and the second corresponding angle in the second corresponding triangle may be equal to zero. However, in actual operation, the corresponding triangles in the first triangulation mesh and the second triangulation mesh may be not completely similar. In this case, the same effect can be achieved by causing the corresponding triangles in the first triangulation mesh and the second triangulation mesh to be as similar as possible. Therefore, in the process of determining the second angle, a certain error between the second angle and the second corresponding angle is allowed, as long as the error is controlled in the second preset error range. The second preset error range may be set according to actual conditions. For example, the second preset error range may be a range of [0, α], where α may be 20 degrees, which is not limited herein.

In an optional embodiment, the fourth determining sub-module may include:

a ninth determining sub-module configured to determine a first ratio between the first connection line and a first corresponding connection line in the second triangulation mesh corresponding to the first connection line; and a tenth determining sub-module configured to determine the first auxiliary key point based on the first ratio and the first angle.

In this optional embodiment, in a case that one edge and an angle on the edge are determined, the other edge forming the angle may be determined based on a ratio between corresponding edges of the similar triangles according to the triangle similarity principle.

For example, in this embodiment, the first connection line is a line connecting two eye key points on the first triangle in the first triangulation mesh. In this case, the length of the first connection line is determined, and the length of the edge of the first corresponding triangle corresponding to the first connection line of the first triangle is determined. That is, the first ratio between the first connection line and the edge corresponding to the first connection line may be determined. Therefore, the tenth determining sub-module may determine the first auxiliary key point based on the first ratio and the first angle on the first connection line according to the triangle similarity principle.

In an optional embodiment, the fourth determining sub-module may include:

an eleventh determining sub-module configured to determine a second ratio between the third connection line and an edge in the second triangulation mesh corresponding to the third connection line; and a twelfth determining sub-module configured to determine the second auxiliary key point based on the second ratio and the second angle.

In this optional embodiment, in a case that one edge and an angle on the edge are determined, the other edge forming the angle may be determined based on a ratio between corresponding edges of the similar triangles according to the triangle similarity principle, which is similar to that of the first auxiliary key point.

For example, in this embodiment, the third connection line is a line connecting an eye key point and the first auxiliary key point on the second triangle in the first triangulation mesh. In this case, after the first auxiliary key point is determined, the length of the third connection line is determined, and the length of the edge of the second corresponding triangle corresponding to the third connection line of the second triangle is determined. That is, the second ratio between the third connection line and the edge corresponding to the third connection line may be determined. Therefore, the twelfth determining sub-module may determine the second auxiliary key point based on the second ratio and the second angle on the third connection line according to the triangle similarity principle In an optional embodiment, a minimum value of the second preset error range is zero.

In this optional embodiment, if the corresponding triangles in the first triangulation mesh and the second triangulation mesh are kept as similar as possible, the eye makeup effect image can be transformed to the face image, and the best effect can be achieved. In this case, it may be considered that the first triangle is completely similar to the first corresponding triangle, and the error between the first angle and the first corresponding angle is zero. It may further be considered that the second triangle is completely similar to the second corresponding triangle, and the error between the second angle and the second corresponding angle is zero. The eye on the standard face image on the standard template is typically always in an opening state. However, in the actual application process, the state of the eye on the detected face image changes constantly. That is, the eye may be in an opening state at a time instant, and may be in an opening state at another time instant. Therefore, for example, in the case that the eye is in the closing state, the corresponding triangles in the first triangulation mesh and the second triangulation mesh may not be completely similar, and the error between the corresponding angles is also not zero. In order to ensure the effect, the error may be kept in the second preset error range.

In an optional embodiment, the image processing device may further include:

a first determining module configured to determine an opening and closing degree of an eye on the face image based on the eye key points; and a second determining module configured to determine the first difference value and the second difference value based on the opening and closing degree.

In this optional embodiment, in the standard face image on the standard template pre-established by the image processing system, the eye is typically completely opened, and the opening and closing degree of the eye in this case may be set to be largest. In the case that the eye is closed, the opening and closing degree may be considered to be smallest. Therefore, taking the standard template as a reference, if the opening and closing degree of the eye on the detected face image is consistent with the opening and closing degree of the eye on the standard face image, the corresponding triangles in the first triangulation mesh and the second triangulation mesh may be considered to be most similar to each other, and the error between the corresponding angles is smallest, that is, the first difference value and the second difference value are smallest. In addition, if the opening and closing degree of the eye on the detected face image is small, the similarity between the corresponding triangles in the first triangulation mesh and the second triangulation mesh is small, and the error between the corresponding angles is large, that is, the first difference value and the second difference value are large. It should be noted that the first difference value and the second difference value may be equal or not equal to each other, as long as both the first difference value and the second difference value are in the second preset error range.

The opening and closing degree of the eye may be determined by positions of the eye key points. For example, the opening and closing degree of the eye is determined by a difference between ordinates of the eye key point having the largest ordinate on the eyelid and the eye key point on the eye corner, among the eye key points. A large difference corresponds to a large opening and closing degree, and a small difference corresponds to a small opening and closing degree.

In an optional embodiment, the second determining module may include:

a first setting sub-module configured to set each of the first difference value and the second difference value as a minimum value of the second preset error range in a case that the opening and closing degree reaches a preset maximum value; and a second setting sub-module configured to set each of the first difference value and the second difference value as a maximum value of the second preset error range in a case that the opening and closing degree reaches a preset minimum value.

In this optional embodiment, in the case that the opening and closing degree of the eye on the detected face image is largest, that is, in the case that the opening and closing degree of the eye on the detected face image is consistent with the opening and closing degree of the eye in the standard template, the first setting sub-module may set the difference between the angle of the triangle in the first triangulation mesh and the corresponding angle of the corresponding triangle in the second triangulation mesh to be the minimum value of the second preset error range, that is, the corresponding triangles in the first triangulation mesh and the second triangulation mesh are most similar to each other. In addition, in the case that the opening and closing degree of the eye on the detected face image is smallest, the second setting sub-module may set the difference between the angle of the triangle in the first triangulation mesh and the corresponding angle of the corresponding triangle in the second triangulation mesh to be the maximum value of the second preset error range, that is, the similarity error between the corresponding triangles in the first triangulation mesh and the second triangulation mesh reaches a maximum value. Therefore, the first difference value and the second difference value may be set to be the minimum value in the case that the eye on the face image is in a completely opening state, and the first difference value and the second difference value may be set to be the maximum value in the case that the eye on the face image is in the closing state.

In an optional embodiment, the triangles in the second triangulation mesh are equilateral triangles.

In this optional implementation, the triangles in the second triangulation mesh on the standard template are all equilateral triangles, that is, the angles of the triangles are all 60 degrees. In this case, in the corresponding triangle on the first triangulation mesh, the size of the angle with the eye key point as a vertex may be set to be 60 degrees plus an error in the second preset error range, where the error varies with the opening and closing degree of the eyes on the detected face image. In this way, the transformation of the eye makeup effect image can be achieved with a good effect with the image processing method according to the present embodiment, not easily generating the distortion.

In an optional embodiment, the transformation module 43 may include:

a thirteenth determining sub-module configured to determine a correspondence relationship between the first triangulation mesh and the second triangulation mesh; and a transformation sub-module configured to transform, based on the correspondence relationship, the eye makeup effect image in the second triangulation mesh to the predetermined eye position on the face image in the first triangulation mesh.

In this optional implementation, after the auxiliary key points are determined, the first triangulation mesh is formed at the predetermined eye position on the face image. In the process of transforming the eye makeup effect image on the standard template to the detected face image, the thirteenth determining sub-module may determine the correspondence relationship between the first triangulation mesh and the second triangulation mesh, that is, a correspondence relationship between vertex coordinates of the corresponding triangles in the first triangulation mesh and the second triangulation mesh, and the transformation sub-module transforms, based on the coordinate correspondence relationship, the image in each triangle region in the second triangulation mesh into a corresponding triangle region in the first triangulation mesh, thereby achieving the transformation of the eye makeup effect image.

Figure 5:
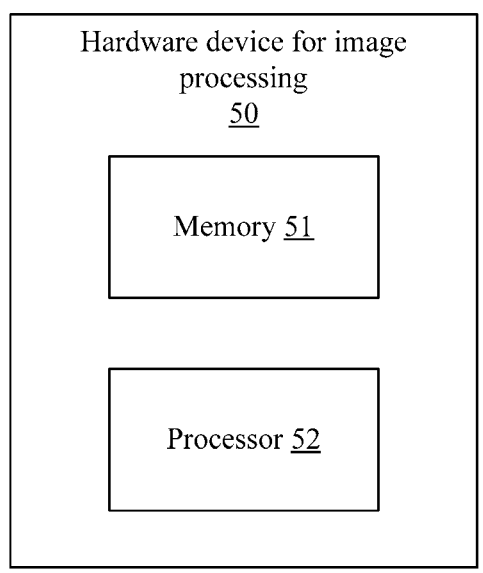
FIG. 5 is a schematic structural diagram of a hardware device for image processing according to an embodiment of the present disclosure.

FIG. 5 is a hardware block diagram showing a hardware device for image processing according to an embodiment of the present disclosure. As shown in FIG. 5, a hardware device 50 for image processing according to an embodiment of the present disclosure includes a memory 51 and a processor 52.

The memory 51 is configured to store non-transitory computer readable instructions. Specifically, the memory 51 may include one or more computer program products, which may include various forms of computer readable storage mediums, such as a volatile memory and/or a non-volatile memory. The volatile memory may include, for example, a random access memory (RAM) and/or a cache. The non-volatile memory may include, for example, a read only memory (ROM), a hard disk, or a flash memory.

The processor 52 may be a central processing unit (CPU) or other form of processing unit with data processing capabilities and/or instruction execution capabilities, and may control other components in the hardware device 50 for image processing to perform desired functions. In an embodiment of the present disclosure, the processor 52 is configured to execute the computer readable instructions stored in the memory 51 such that the hardware device 50 for image processing performs all or a part of the steps in the image processing method according to the embodiments of the present disclosure.

Those skilled in the art should understand that, in order to solve the technical problem of how to obtain good user experience, the present embodiment may also include well-known structures such as a communication bus and an interface, and these well-known structures are also included in the protection scope of the present disclosure.

For a detailed description of the present embodiment, reference may be made to the corresponding description in the foregoing embodiments, and details are not described herein again.

Figure 6:
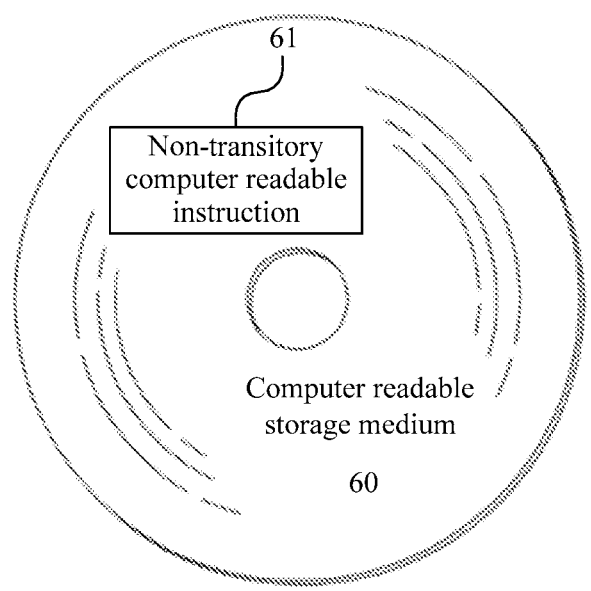
FIG. 6 is a schematic structural diagram of a computer readable storage medium according to an embodiment of the present disclosure.

FIG. 6 is a schematic diagram showing a computer readable storage medium according to an embodiment of the present disclosure. As shown in FIG. 6, a computer readable storage medium 60 according to an embodiment of the present disclosure has stored thereon non-transitory computer readable instructions 61. When executed by a processor, the non-transitory computer readable instructions 61 cause the processor to perform all or a part of the steps in the image processing method according to the embodiments of the present disclosure.

The computer readable storage medium 60 includes, but is not limited to, an optical storage medium (for example, CD-ROM and DVD), a magneto-optical storage medium (for example, MO), a magnetic storage medium (for example, a magnetic tape or a mobile hard disk), a medium (for example, a memory card) having a built-in rewritable non-volatile memory, and a medium (for example, a ROM box) having a built-in ROM.

For a detailed description of the present embodiment, reference may be made to the corresponding description in the foregoing embodiments, and details are not described herein again.

Figure 7:
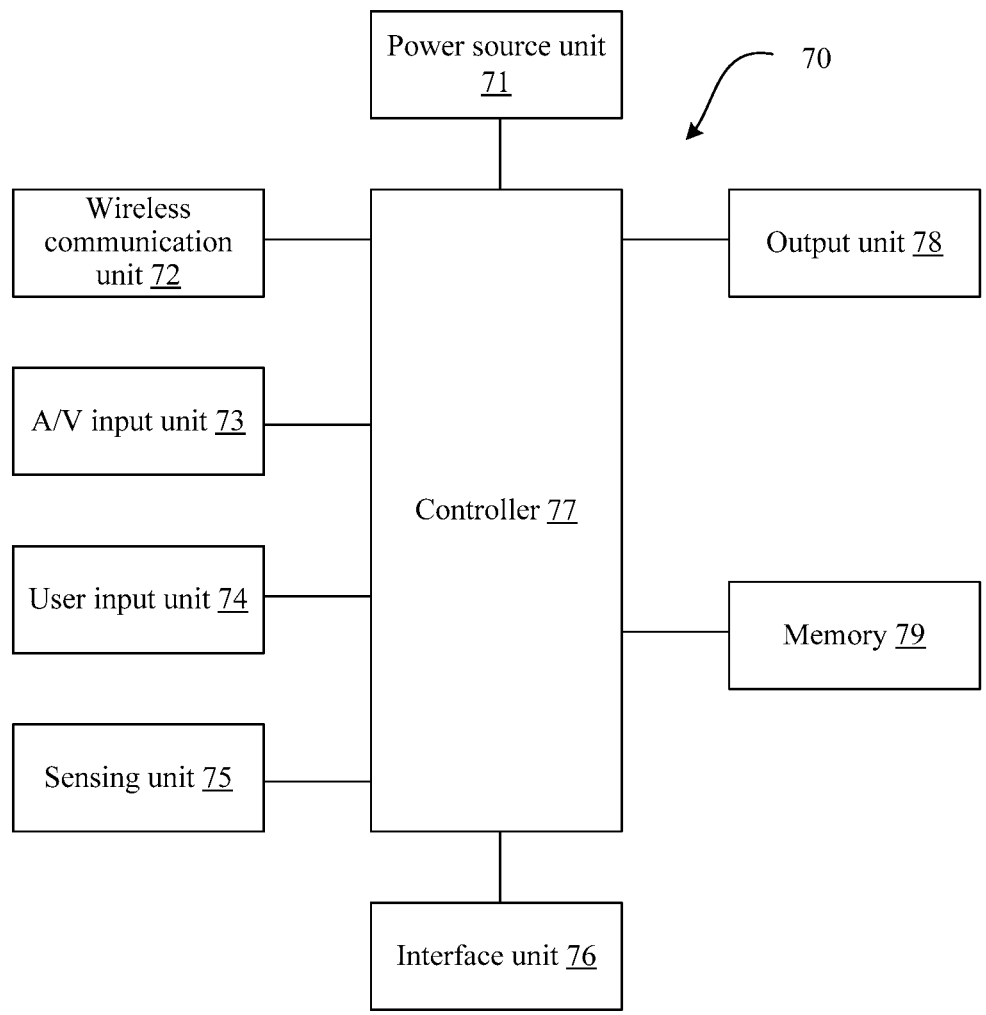
FIG. 7 is a schematic structural diagram of an image processing terminal according to an embodiment of the present disclosure.

FIG. 7 is a schematic diagram showing a hardware structure of an image processing terminal according to an embodiment of the present disclosure. As shown in FIG. 7, an image processing terminal 70 includes components in the embodiment of the image processing device described above.

The terminal may be implemented in various forms. The terminal provided in the present disclosure may include, but is not limited to, mobile terminals such as mobile phones, smart phones, notebook computers, digital broadcast receivers, Personal Digital Assistants (PDAs), tablet computers (PADs), portable multimedia players (PMPs), navigation devices, in-vehicle terminals, in-vehicle display terminals and in-vehicle electronic rearview mirrors, and fixed terminals such as digital TVs and desktop computers.

As an equivalent alternative embodiment, the terminal may further include other components. As shown in FIG. 7, the image processing terminal 70 may include a power source unit 71, a wireless communication unit 72, an audio/video (A/V) input unit 73, a user input unit 74, a sensing unit 75, an interface unit 76, a controller 77, an output unit 78, a memory 79, and the like. Although FIG. 7 illustrates a terminal having various components, it should be understood that, not all illustrated components are required to be implemented, or more or fewer components may be implemented instead.

The wireless communication unit 72 allows for radio communication between the terminal 70 and a wireless communication system or network. The A/V input unit 73 is used for receiving an audio or video signal. The user input unit 74 may generate key input data in response to a command inputted by the user to control various operations of the terminal. The sensing unit 75 detects a current state of the terminal 70, a position of the terminal 70, the presence or absence of user touch input to the terminal 70, an orientation of the terminal 70, acceleration or deceleration movement and direction of the terminal 70, and the like, and the sensing unit 75 generates a command or signal for controlling operations of the terminal 70. The interface unit 76 serves as an interface through which at least one external device may be connected to the terminal 70. The output unit 78 is configured to provide an output signal in a visual, audio, and/or tactile manner. The memory 79 may store software programs that are executed by the controller 75 to process and control operations, or may temporarily store data that has been outputted or is to be outputted. The memory 79 may include at least one type of storage medium. Moreover, the terminal 70 may cooperate with a network storage device that performs a storage function of the memory 79 through network connection. The controller 77 typically controls the overall operation of the terminal. Additionally, the controller 77 may include a multimedia module for reproducing or playing back multimedia data. The controller 77 may perform a pattern recognition process to recognize a handwriting input or a picture drawing input performed on the touch screen as a character or an image. The power source unit 71 receives external power or internal power under the control of the controller 77 and provides appropriate power required to operate various elements and components.

Various embodiments of the image processing method provided in the present disclosure may be implemented in a computer readable medium using, for example, computer software, hardware, or any combination thereof. For hardware implementation, the various embodiments of the image processing method provided in the present disclosure may be implemented by using at least one of an application specific integrated circuit (ASIC), a digital signal processor (DSP), a digital signal processing device (DSPD), a programmable logic device. (PLD), a field programmable gate array (FPGA), a processor, a controller, a microcontroller, a microprocessor, and an electronic unit that is designed to perform the functions described herein. In some cases, the various embodiments of the image processing method provided in the present disclosure may be implemented in the controller 77. For software implementation, the various embodiments of the image processing method provided in the present disclosure may be implemented by using a separate software module that allows for the execution of at least one function or operation. Software codes may be implemented by a software application (or program) written in any suitable programming language, and may be stored in the memory 79 and is executed by the controller 77.

For a detailed description of the present embodiment, reference may be made to the corresponding description in the foregoing embodiments, and details are not described herein again.

The basic principles of the present disclosure have been described above in connection with the specific embodiments. However, it should be noted that the advantages, superiorities, effects, and the like mentioned in the present disclosure are merely exemplary and are not limiting, and the advantages, superiorities and effects are not considered to be necessarily required by the various embodiments of the present disclosure. In addition, the specific details disclosed above are only for the purpose of illustration and ease of understanding, and are not intended to limit the present disclosure.

Block diagrams of elements, devices, apparatuses and systems shown in the present disclosure are merely illustrative and are not intended to require or imply that the elements, the devices, the apparatuses and the systems must be connected, arranged, and configured in the manner shown in the block diagram. As should be appreciated by those skilled in the art, these elements, devices, apparatuses and systems may be connected, arranged, and configured in any manner. Terms such as "including", "comprising" and "having" are open, and mean "including but not limited to" and may be used interchangeably. Terms "or" and "and" used herein mean the word "and/or" and may be used interchangeably unless the context clearly indicates otherwise. The term "such as" used herein refers to a phrase "such as but not limited to" and is used interchangeably.

In addition, as used herein, a word "or" used in enumeration of items starting with "at least one", indicates separate enumeration, thus enumeration such as "at least one of A, B and C" encompass cases of A or B or C, AB or AC or BC, or ABC (i.e., A and B and C). Moreover, the wording "exemplary" does not mean that the described examples are preferred or better than the other examples.

It should further be noted that in the systems and methods of the present disclosure, various components or steps may be decomposed and/or recombined. These decompositions and/or recombinations should be considered as equivalents to the present disclosure.

Various changes, substitutions and alterations of the technologies described herein may be made without departing from the teachings of the present disclosure as defined in the appended claims. Further, the scope of the claims of the present disclosure is not limited to the specific aspects of the processes, the machine, the manufacture, the composition of the event, the means, the method and the action described above. Processes, machines, manufactures, compositions of events, means, methods or actions that are presently present or later developed may be utilized to perform substantially the same functions or implement substantially the same effects as the aspects described herein. Accordingly, such process, machine, manufacture, composition of event, means, method or action are included in the scope of the appended claims.

The above description of the disclosed aspects is provided to enable those skilled in the art to make or use the present disclosure. Various modifications to these aspects are apparent to those skilled in the art, and general principles defined herein may be applied to other aspects without departing from the scope of the present disclosure. Therefore, the present disclosure is not intended to be limited to the aspects shown herein, but in the broadest scope of the principles and novel features disclosed herein.

The foregoing description has been presented for purposes of illustration and description. Further, the description is not intended to limit the embodiments of the present disclosure to the forms disclosed herein. Although a number of example aspects and embodiments have been discussed above, those skilled in the art will recognize certain variations, modifications, changes, additions and subcombinations thereof

The invention claimed is:

1. An image processing method, comprising:
recognizing eye key points on a face image;
performing interpolation to obtain auxiliary key points, wherein the auxiliary key points and the eye key points form a first triangulation mesh at a predetermined eye position on the face image;
transforming, based on the first triangulation mesh, an eye makeup effect image to the predetermined eye position;
wherein the performing interpolation to obtain auxiliary key points further comprises:
acquiring a second triangulation mesh on a standard template corresponding to the first triangulation mesh, wherein the eye makeup effect image is drawn on the standard template; and
determining the auxiliary key points on the first triangulation mesh based on the second triangulation mesh, wherein the similarity between a triangle in the first triangulation mesh and a corresponding triangle in the second triangulation mesh is in a first preset error range.

2. The method according to claim 1, wherein the eye makeup effect image comprises at least one of an eyelash, a double eyelid, a single eyelid, an eye shadow, and an eyeliner.

3. The method according to claim 1, wherein the determining the auxiliary key points on the first triangulation mesh based on the second triangulation mesh comprises:
determining a first angle between a first connection line and a second connection line in the first triangulation mesh based on the second triangulation mesh, wherein the first connection line is a line connecting a first eye key point and a second eye key point that are adjacent to each other, and the second connection line is a line connecting the second eye key point and a first auxiliary key point, wherein the first eye key point, the second eye key point and the first auxiliary key point are three vertices of a first triangle in the first triangulation mesh;
determining a second angle between a third connection line and a fourth connection line based on the second triangulation mesh, wherein the third connection line is a line connecting the second eye key point and a third eye key point that are adjacent to each other, the fourth connection line is a line connecting the second eye key point and a second auxiliary key point, wherein the third eye key point, the second eye key point and the second auxiliary key point are three vertices of a second triangle in the first triangulation mesh; and
determining the first auxiliary key point and the second auxiliary key point based on the first angle, the second angle and the second triangulation mesh.

4. The method according to claim 3, wherein the determining a first angle between a first connection line and a second connection line in the first triangulation mesh based on the second triangulation mesh comprises:
determining a first corresponding triangle in the second triangulation mesh corresponding to the first triangle; and
determining the first angle, wherein a first difference value between the first angle and a first corresponding angle of the first corresponding triangle corresponding to the first angle is in a second preset error range.

5. The method according to claim 4, wherein a minimum value of the second preset error range is zero.

6. The method according to claim 4, further comprising:
determining an opening and closing degree of an eye on the face image based on the eye key points; and
determining the first difference value and the second difference value based on the opening and closing degree.

7. The method according to claim 6, wherein the determining the first difference value and the second difference value based on the opening and closing degree comprises:
setting each of the first difference value and the second difference value as a minimum value of the second preset error range in a case that the opening and closing degree reaches a preset maximum value; and
setting each of the first difference value and the second difference value as a maximum value of the second preset error range in a case that the opening and closing degree reaches a preset minimum value.

8. The method according to claim 3, wherein the determining a second angle between a third connection line and a fourth connection line based on the second triangulation mesh comprises:
determining a second corresponding triangle in the second triangulation mesh corresponding to the second triangle; and
determining the second angle, wherein a second difference value between the second angle and a second corresponding angle of the second corresponding triangle corresponding to the second angle is in a second preset error range.

9. The method according to claim 3, wherein the determining the first auxiliary key point and the second auxiliary key point based on the first angle, the second angle and the second triangulation mesh comprises:
determining a first ratio between the first connection line and a first corresponding connection line in the second triangulation mesh corresponding to the first connection line; and
determining the first auxiliary key point based on the first ratio and the first angle.

10. The method according to claim 3, wherein the determining the first auxiliary key point and the second auxiliary key point based on the first angle, the second angle and the second triangulation mesh comprises:
determining a second ratio between the third connection line and an edge in the second triangulation mesh corresponding to the third connection line; and
determining the second auxiliary key point based on the second ratio and the second angle.

11. The method according to claim 1, wherein the triangle in the second triangulation mesh is an equilateral triangle.

12. The method according to claim 1, wherein the transforming an eye makeup effect image to the predetermined eye position based on the first triangulation mesh comprises:
   determining a correspondence relationship between the first triangulation mesh and the second triangulation mesh; and
   transforming, based on the correspondence relationship, the eye makeup effect image in the second triangulation mesh to the predetermined eye position on the face image in the first triangulation mesh.

13. The method according to claim 1, wherein before the recognizing eye key points on a face image, the method further comprises:
   detecting the face image in response to an event of a user selecting the eye makeup effect image.

14. An image processing device, comprising:
   at least one processor; and
   at least one memory communicatively coupled to the at least one processor and storing instructions that upon execution by the at least one processor cause the device to:
   recognize eye key points on a face image;
   perform interpolation to obtain auxiliary key points, wherein the auxiliary key points and the eye key points form a first triangulation mesh at a predetermined eye position on the face image;
   transform, based on the first triangulation mesh, an eye makeup effect image to the predetermined eye position;
   wherein the at least one memory further storing instructions that upon execution by the at least one processor cause the device to:
   acquire a second triangulation mesh on a standard template corresponding to the first triangulation mesh, wherein the eye makeup effect image is drawn on the standard template; and
   determine the auxiliary key points on the first triangulation mesh based on the second triangulation mesh, wherein the similarity between a triangle in the first triangulation mesh and a corresponding triangle in the second triangulation mesh is in a first preset error range.

15. The device according to claim 14, wherein the at least one memory further stores instructions that upon execution by the at least one processor cause the device to:
   determine a first angle between a first connection line and a second connection line in the first triangulation mesh based on the second triangulation mesh, wherein the first connection line is a line connecting a first eye key point and a second eye key point that are adjacent to each other, and the second connection line is a line connecting the second eye key point and a first auxiliary key point, wherein the first eye key point, the second eye key point and the first auxiliary key point are three vertices of a first triangle in the first triangulation mesh;
   determine a second angle between a third connection line and a fourth connection line based on the second triangulation mesh, wherein the third connection line is a line connecting the second eye key point and a third eye key point that are adjacent to each other, the fourth connection line is a line connecting the second eye key point and a second auxiliary key point, wherein the third eye key point, the second eye key point and the second auxiliary key point are three vertices of a second triangle in the first triangulation mesh; and
   determine the first auxiliary key point and the second auxiliary key point based on the first angle, the second angle and the second triangulation mesh.

16. The device according to claim 15, wherein the at least one memory further stores instructions that upon execution by the at least one processor cause the device to:
   determine a first corresponding triangle in the second triangulation mesh corresponding to the first triangle; and
   determine the first angle, wherein a first difference value between the first angle and a first corresponding angle of the first corresponding triangle corresponding to the first angle is in a second preset error range.

17. The device according to claim 15, wherein the at least one memory further stores instructions that upon execution by the at least one processor cause the device to:
   determine a second corresponding triangle in the second triangulation mesh corresponding to the second triangle; and
   determine the second angle, wherein a second difference value between the second angle and a second corresponding angle of the second corresponding triangle corresponding to the second angle is in a second preset error range.

18. The device according to claim 14, wherein the at least one memory further stores instructions that upon execution by the at least one processor cause the device to:
   detect the face image in response to an event of a user selecting the eye makeup effect image.

19. A non-transitory computer readable storage medium having stored thereon non-transitory computer readable instructions that, when executed by a computer, cause the computer to perform operations, the operations comprising:
   recognizing eye key points on a face image;
   performing interpolation to obtain auxiliary key points, wherein the auxiliary key points and the eye key points form a first triangulation mesh at a predetermined eye position on the face image;
   transforming, based on the first triangulation mesh, an eye makeup effect image to the predetermined eye position;
   wherein the operations further comprise:
   acquiring a second triangulation mesh on a standard template corresponding to the first triangulation mesh, wherein the eye makeup effect image is drawn on the standard template; and
   determining the auxiliary key points on the first triangulation mesh based on the second triangulation mesh, wherein the similarity between a triangle in the first triangulation mesh and a corresponding triangle in the second triangulation mesh is in a first preset error range.

* * * * *